United States Patent
Manus et al.

(10) Patent No.: US 10,939,166 B2
(45) Date of Patent: *Mar. 2, 2021

(54) OPTIMIZATION OF BROADCAST EVENT EFFECTIVENESS

(71) Applicant: Bliss Point Media, Inc., San Francisco, CA (US)

(72) Inventors: Justin Manus, San Francisco, CA (US); Sean Odlum, San Francisco, CA (US); Anand V. Bodapati, San Francisco, CA (US)

(73) Assignee: Bliss Point Media, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/595,648

(22) Filed: Oct. 8, 2019

(65) Prior Publication Data
US 2020/0045371 A1 Feb. 6, 2020

Related U.S. Application Data

(63) Continuation of application No. 16/280,765, filed on Feb. 20, 2019, now Pat. No. 10,491,951, which is a continuation of application No. 15/495,561, filed on Apr. 24, 2017, now Pat. No. 10,257,572.

(60) Provisional application No. 62/441,883, filed on Jan. 3, 2017.

(51) Int. Cl.
| | |
|---|---|
| *H04N 21/442* | (2011.01) |
| *H04N 21/81* | (2011.01) |
| *G06Q 10/06* | (2012.01) |
| *G06N 20/00* | (2019.01) |
| *H04N 21/24* | (2011.01) |
| *G06N 7/00* | (2006.01) |
| *H04N 21/25* | (2011.01) |

(52) U.S. Cl.
CPC ....... *H04N 21/44222* (2013.01); *G06N 7/005* (2013.01); *G06N 20/00* (2019.01); *G06Q 10/06393* (2013.01); *H04N 21/2407* (2013.01); *H04N 21/25* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 5,704,017 | A | 12/1997 | Heckerman et al. |
| 6,029,176 | A | 2/2000 | Cannon et al. |
| 7,373,650 | B1 | 5/2008 | Rodriguez et al. |
| 7,937,725 | B1 | 5/2011 | Schaffer et al. |
| 7,962,935 | B2 | 6/2011 | Kurosaki et al. |

(Continued)

*Primary Examiner* — An Son P Huynh
(74) *Attorney, Agent, or Firm* — Perkins Coie LLP; Colin Fowler

(57) ABSTRACT

Introduced herein are methods and systems for determining machine learning marketing strategy. For example, a computer-implemented method according to the disclosed technology includes steps of identifying one or more business metrics to be driven by a marketing plan; generating one or more response functions of the business metrics by performing a machine learning process on a marketing dataset; optimizing a spending subject of the marking plan subject to constraints to generate a marketing strategy based on multiple decision variables; and presenting the marketing strategy to an advertiser.

20 Claims, 8 Drawing Sheets

(56) References Cited

U.S. PATENT DOCUMENTS

| | | |
|---|---|---|
| 8,196,168 B1 * | 6/2012 | Bryan .................... H04N 5/783 725/46 |
| 8,204,779 B1 | 6/2012 | Hughes et al. |
| 8,327,395 B2 | 12/2012 | Lee et al. |
| 8,458,745 B2 | 6/2013 | Shanks et al. |
| 8,495,683 B2 | 7/2013 | Van Coppenolle et al. |
| 8,745,647 B1 | 6/2014 | Shin et al. |
| 8,789,109 B2 | 7/2014 | Joh et al. |
| 8,856,846 B2 | 10/2014 | Applegate et al. |
| 8,930,204 B1 | 1/2015 | Igoe et al. |
| 9,363,464 B2 | 6/2016 | Alexander |
| 9,420,320 B2 | 8/2016 | Doe et al. |
| 9,578,379 B1 | 2/2017 | Lappert et al. |
| 9,736,503 B1 | 8/2017 | Bakshi et al. |
| 10,178,421 B2 | 1/2019 | Thomas et al. |
| 10,185,971 B2 | 1/2019 | Hood et al. |
| 10,257,572 B2 | 4/2019 | Manus et al. |
| 2002/0056087 A1 | 5/2002 | Berezowski et al. |
| 2003/0067544 A1 | 4/2003 | Wada et al. |
| 2003/0093792 A1 | 5/2003 | Labeeb et al. |
| 2003/0115585 A1 | 6/2003 | Barsness et al. |
| 2003/0145323 A1 | 7/2003 | Hendricks et al. |
| 2004/0133448 A1 | 7/2004 | Higashi et al. |
| 2005/0149964 A1 | 7/2005 | Thomas et al. |
| 2006/0020962 A1 | 1/2006 | Stark et al. |
| 2006/0212900 A1 | 9/2006 | Ismail et al. |
| 2006/0282311 A1 | 12/2006 | Jiang |
| 2007/0136322 A1 | 6/2007 | Cormack et al. |
| 2007/0136753 A1 | 6/2007 | Bovenschulte et al. |
| 2007/0288965 A1 | 12/2007 | Murakami et al. |
| 2008/0120650 A1 | 5/2008 | Orihara et al. |
| 2008/0140524 A1 | 6/2008 | Anand et al. |
| 2008/0271098 A1 | 10/2008 | Kalaboukis et al. |
| 2009/0132346 A1 | 5/2009 | Duggal et al. |
| 2010/0031162 A1 | 2/2010 | Wiser et al. |
| 2010/0251295 A1 * | 9/2010 | Amento ............... H04N 21/475 725/38 |
| 2010/0333137 A1 | 12/2010 | Hamano et al. |
| 2011/0016479 A1 | 1/2011 | Tidwell et al. |
| 2011/0119595 A1 | 5/2011 | Bydeley et al. |
| 2011/0289422 A1 | 11/2011 | Spivack et al. |
| 2011/0321072 A1 | 12/2011 | Patterson et al. |
| 2012/0137316 A1 | 5/2012 | Elizarov et al. |
| 2012/0151511 A1 | 6/2012 | Bernard et al. |
| 2013/0080264 A1 | 3/2013 | Umeda |
| 2013/0311408 A1 | 11/2013 | Bagga et al. |
| 2014/0067855 A1 | 3/2014 | Shartzer et al. |
| 2014/0100944 A1 | 4/2014 | Zhu et al. |
| 2014/0104495 A1 | 4/2014 | Preston et al. |
| 2014/0281978 A1 | 9/2014 | Ye et al. |
| 2014/0325401 A1 | 10/2014 | Wattenhofer et al. |
| 2014/0358645 A1 | 12/2014 | Ehrman et al. |
| 2015/0046251 A1 | 2/2015 | Smith |
| 2015/0213389 A1 | 7/2015 | Modarresi |
| 2015/0358677 A1 | 12/2015 | Papa |
| 2016/0381427 A1 | 12/2016 | Taylor et al. |
| 2017/0034558 A1 | 2/2017 | Pottier et al. |
| 2017/0034591 A1 | 2/2017 | Ray et al. |
| 2017/0078719 A1 * | 3/2017 | Bettendorf ......... H04N 21/2393 |
| 2017/0132553 A1 | 5/2017 | Theirl et al. |
| 2017/0230846 A1 | 8/2017 | Wang et al. |
| 2018/0288119 A1 | 10/2018 | Lee et al. |
| 2019/0182545 A1 | 6/2019 | Manus et al. |

\* cited by examiner

US 10,939,166 B2

OPTIMIZATION OF BROADCAST EVENT EFFECTIVENESS

CROSS-REFERENCE TO RELATED APPLICATIONS

This application is a continuation of U.S. patent application Ser. No. 16/280,765, filed Feb. 20, 2019, now U.S. Pat. No. 10,491,951, issued Nov. 26, 2019, which is a continuation of U.S. patent application Ser. No. 15/495,561, filed Apr. 24, 2017, now U.S. Pat. No. 10,257,572, issued Apr. 9, 2019, which claims priority to U.S. Provisional Patent Application Ser. No. 62/441,883, filed Jan. 3, 2017. The aforementioned applications are incorporated herein by reference in their entirety.

TECHNICAL FIELD

The disclosure relates to machine learning and constrained optimization. More particularly, this disclosure relates to the use of machine learning to attribute events within a dataset to changes in a quantifiable performance metric.

BACKGROUND

Making decisions on how to market a product or service is usually is a nebulous affair. Results are not generally clear cut or quantifiable. How does one define marketing success? How does one know how to attribute some portion of that success to a given advertisement? How does one learn from that attribution? Presently these questions don't have simple answers and are addressed by humans often using arbitrary or convoluted systems. Developing the final marketing strategy becomes very arduous in dealing with the large amount of data, such as media records, product/service key performance indicator (KPI) data, and offers.

DETAILED DESCRIPTION

A marketer, in a general sense, has a decision as to how to spend their money. These decisions occur at the macro level at the portfolio level. For example, how much does the marketer spend at a first high-traffic web site, versus another high-traffic website, versus TV; effectively which channel? At the micro level, the marketer determines tighter details such as which keywords to bid on, what audience demographic to target, what time of day to run, what day of the week, which creative copy, etc. Herein described is a system and method to receive marketing data and process that data in order to determine a quantifiable value to each of these choices, thereby enabling the marketer to make better decisions.

In attributing the value of a given advertisement or broadcast event to success or failure, the concept of time is very important. Each single time a broadcast event runs, the system records a very precise time stamp, down to the second. The system correlates the time stamp of each broadcast event to a quantifiable metric that represents success. The quantifiable metrics are sometimes referred to as key performance indicators (KPI).

KPIs are discreet consumer actions and are selected based on appropriateness to a given product/service. Broad examples include: purchases of the product/service, mailing list or account sign-ups, incoming phone calls, or consumer signatures. Examples focused on interactions with websites or applications include: views, downloads, clicks, logins, or quantifiable functional activity (e.g., a user providing input to a game). Chosen KPIs are measured as a function of time. The duration of the time may vary tremendously case-to-case. A given KPI data history may include only 2-3 weeks of data or 20 years of data. Thus, the system uses as input ads with a precise time stamp and KPIs measured as a function of time. The system generates an effectiveness rating for each of the broadcast events and/or granular components of the broadcast event. This data may be plotted as depicted in FIG. 1.

Figure 1:
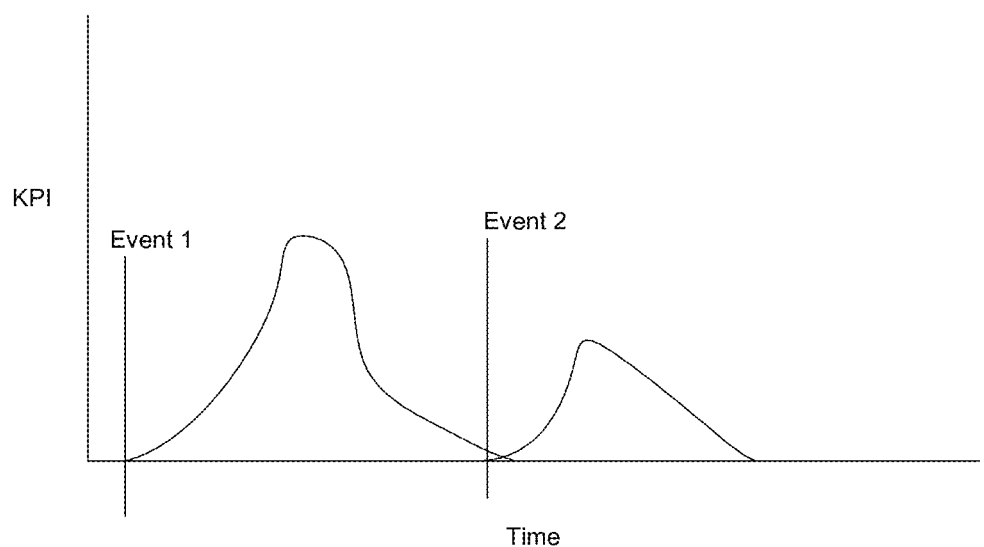
FIG. 1 is a graphical plot of a quantifiable metric measured as a function of time and including two isolated broadcast events.

FIG. 1 is a graphical plot of a quantifiable metric measured as a function of time and including two isolated broadcast events. In order to determine an effectiveness rating, an effectiveness period is assigned to each broadcast event. The effectiveness period is indicated by KPI measurements after the time stamp of each broadcast event and includes two periods: ramp-up, and ramp-down. The ramp-up period is the latency between the broadcast event occurring and the peak of the response. The ramp down period is from the peak of the response back to a background baseline level. A parameterized curve is integrated (area under curve) in order to develop a magnitude of effectiveness. Depicted are two curves, each occurring after broadcast events 1 and 2. Integrating each curve provides an effectiveness rating for the preceding broadcast event.

Figure 2:
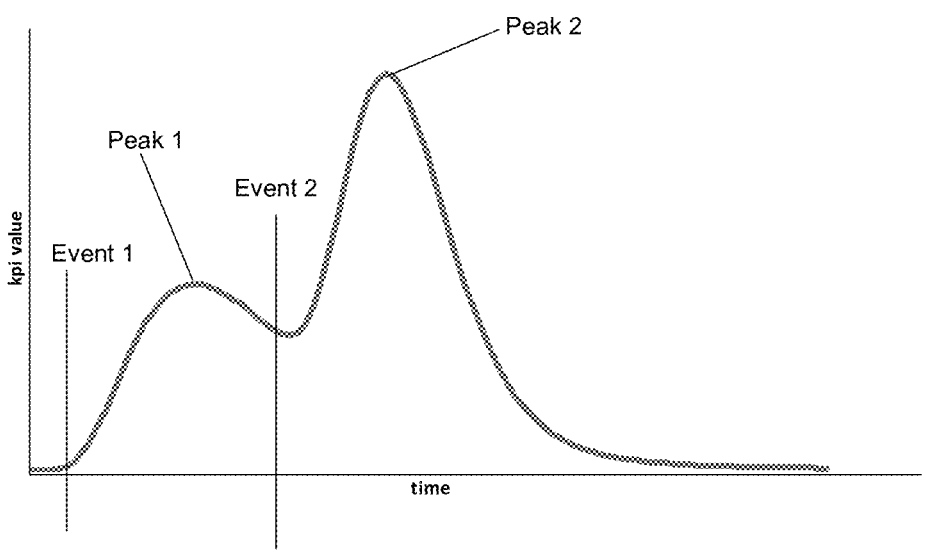
FIG. 2 is a graphical plot of a quantifiable metric measured as a function of time and including two overlapping broadcast events.

FIG. 2 is a graphical plot of a quantifiable metric measured as a function of time, and including two overlapping broadcast events. In some cases, the system runs into broadcast event collision, events with timestamps running very close together. In some embodiments, the system performs wave decomposition to attribute KPI success/failure to broadcast events with effective periods that overlap. To do this, the system examines the KPI history for peak responses and then decomposes each peak into a sum of multiple curves.

As pictured in FIG. 2, the effectiveness periods, as measured by ramp up and ramp down periods, overlap. Raw KPI data does not provide the nuance of attribution, thus the attribution must be estimated. In some embodiments, the curve is estimated through machine-learned models of previous KPI data. In some embodiments, the estimation is determined using the derivative of the slope of the KPI data as two curves overlap.

Figure 3:
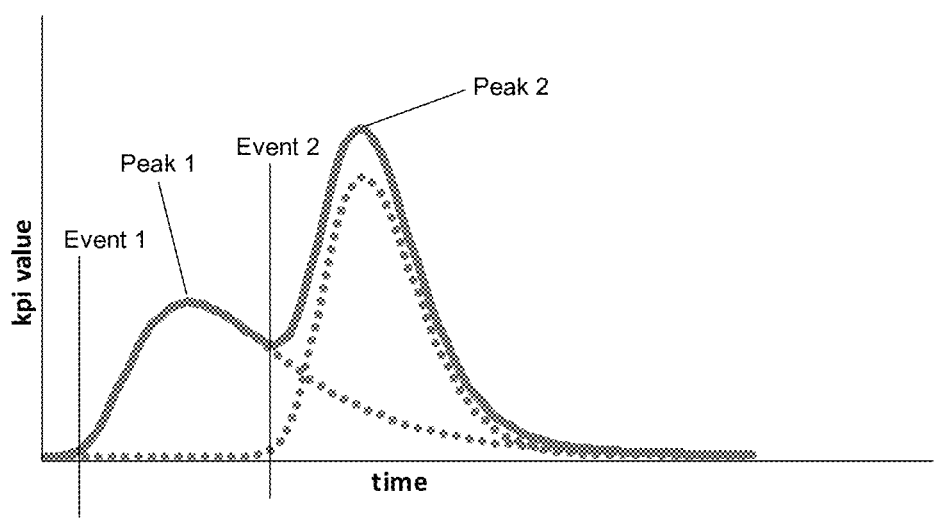
FIG. 3 is a second example of a graphical plot of a quantifiable metric measured as a function of time and including two overlapping broadcast events.

FIG. 3 is an example of a graphical plot of a quantifiable metric measured as a function of time, and including two overlapping broadcast events and attribution curves. In some cases, broadcast event collision is not clear. In FIG. 3, including events 1 and 2 corresponding to peaks 1 and 2, the effect of event 2 after the introduction of event 1 accelerates the KPI increase, and causes the KPI values to level off for a period of time. In this case, the system identifies peak 2 based on the expectation that the ramp down period from event 1 is a smooth curve. Further, the KPI value for event 1 is increased based upon the ramp up period for event 2. Therefore the effectiveness rating attributable to event 1 is the integral of the curve below the dotted line associated with peak 1. Conversely, the effectiveness rating attributable to event 2 is the integral of the curve above the dotted line associated with peak one. Where to place the dotted line may be determined by substituting a value for either broadcast event using a comparable event in the KPI history data. Alternatively, or in conjunction, the present data is used to make projections based on the slope of the KPI history curve surrounding each peak, and at curve intersections.

Figure 4:
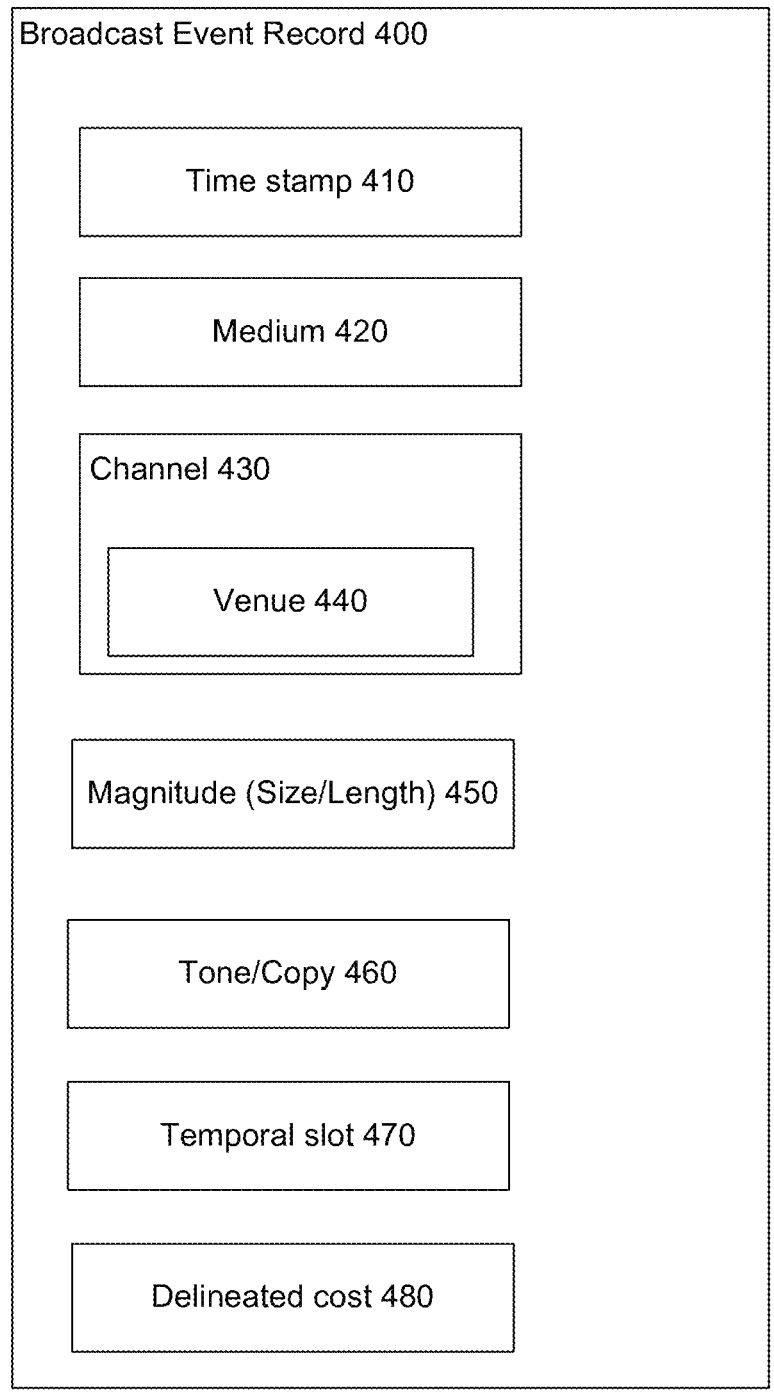
FIG. 4 is a block diagram of a broadcast event record.

FIG. 4 is a block diagram of a broadcast event record. Each broadcast event includes a number of details to which an effectiveness is credited. In order to process necessary data, the system stores broadcast event records 400 within a database. As previously discussed, a broadcast event record 20 for a given broadcast event has a very precise time stamp 410. The timestamp 410, like the rest of the data stored with a given broadcast event record 400 is metadata.

Broadcast events include a number of important metadata characteristics stored in a broadcast event record 400. The medium 420 of the subject broadcast event refers to the type of proclamation the broadcast event is. Example mediums 420 include: pictographic, auditory, video, text, or multimedia. The channel 430 of the subject broadcast event refers to where the broadcast event may be found. Example channels 430 include: websites, TV, radio, podcasts, and physical signage. Channels 430 further include a sub-characteristic of venue 440. The venue 440 is the particular implementation of the selected channel 430. For example a particular website (e.g., Facebook or, more specifically, a particular Facebook group page), a particular TV channel (e.g., ESPN, or, more specifically, EPSN in northern California), a particular TV show (e.g., morning news), a particular radio channel (e.g., FM 105.3 in San Jose, Calif.), a particular podcast host (e.g., Adam Carolla), or a signage (e.g., billboard on 1st and Main St.).

Another characteristic is the magnitude 450 of the broadcast event. Magnitude 450 refers to details such as the length of the event (e.g., a television commercial that is 15, 30, or 60 seconds long), or the size of the event (e.g., signage that is 8'×4'). The tone 460 of the broadcast event is the sort of feelings the event is intended to invoke in consumers. For example broadcast event may intend to invoke pride, urgency, exclusivity, or other traits in the consumer. In some embodiments, where the tone 460 is similar, different sets of specific copy are compared instead.

The temporal slot 470 of the subject broadcast event refers to when the event occurs. Examples include, mornings, prime time, seasonal, "halfway through" some subject work, or other suitable temporal placements known in the art. The temporal slot 470 may also be conjoined with the venue 440. In some embodiments, the venue 440 has a very specific temporal slot 470 (e.g., Sunday Night Football is on at the same time every week).

Finally, advertising includes an associated cost. However, varying some of the above characteristics affects the cost. Thus, the cost is a delineated cost 480 that is attributable in part to each of the above characteristics. For example, a given venue 440 may have a greater cost for high magnitude events than for low magnitude events.

Each of the above characteristics of a broadcast event record 400 provide a more granular look at each event. When placed along with KPI history data, an effectiveness value can be determined for these characteristics individually. This is performed by isolating particular characteristics. Where two events have similar characteristics with one variance, changes in the KPI history data are attributable to that difference in characteristic. The particular characteristic may be assigned the effectiveness of that difference in KPI.

Machine learning algorithms and hierarchical-based models are used to perform this signal processing step. The system parses through the KPI history data which is compared to the broadcast event records 20 in order to test the characteristics in each broadcast event record 20 and to optimize each.

In some cases, broadcast events having identical or substantially similar characteristics generate different effectiveness results. In these circumstances the KPI data is used to improve the machine learning observation pool. The multiple effectiveness ratings may be averaged, or used to generate a hierarchical model. For example, where a user runs two ads on ESPN in primetime, one time the ads generated 450 app downloads, the other time it generated 10 app downloads. One result is to take simple averages (e.g., "20" effectiveness). In some embodiments, the system generates a hierarchical model for the distribution of the response of running the ad on ESPN prime time. These details go into the machine learning optimization output.

The optimization process can be, e.g., a non-linear, combinatorial tradeoff optimization process over a large number (e.g., thousands) of variables. For example, a client can have a choice of 70 cable networks as platform for serving advertisements or marketing campaigns. There are two types of availabilities: national or local. The client has choices of two creative assets (e.g., video advertisements). There are two choices of length for the creative assets: 15-seconds and 30-seconds. There are six day-part rotations (in other words, the broadcast day is divided into six parts). There are choices of seven days of the week for broadcasting. In combination, the marketer faces 23,500 decision variables. Instead of just relying on a buyer's intuition to make the complex decisions, the disclosed technology provides a marketing solution based on the non-linear, combinatorial tradeoff optimization over existing data.

Figure 5:
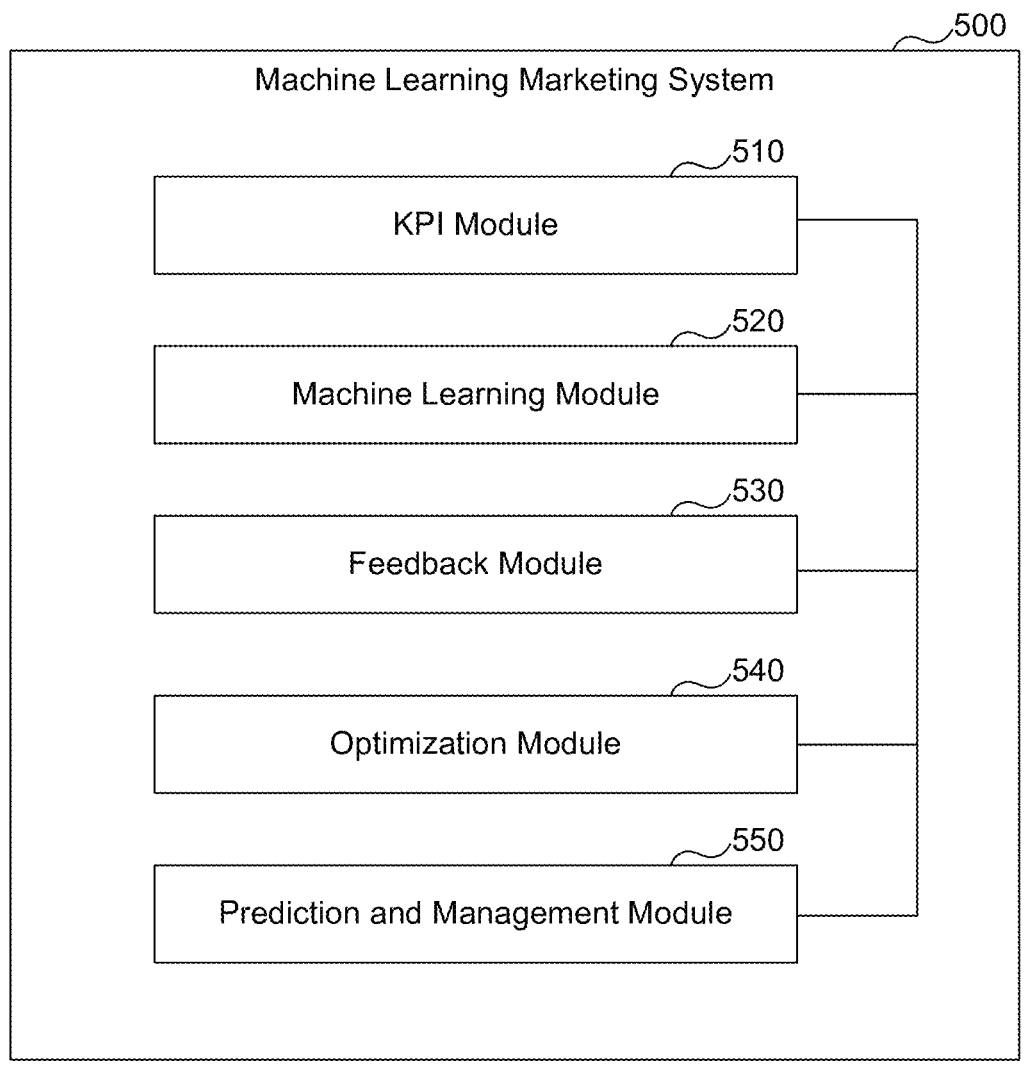
FIG. 5 illustrates modules of a machine learning marketing strategy system according to the disclosed technology.

FIG. 5 illustrates modules of a machine learning marketing strategy system according to the disclosed technology. As illustrates in FIG. 5, the machine learning marketing system 500 includes a KPI module 510, a machine learning module 520, a feedback module 530, a optimization module 540, and a prediction and management module 550. The KPI module 510 defines the outcome KPIs (key performance indicators) that the marketing platforms (e.g., TV networks for serving advertisements) should drive. For example, the KPIs can include visits to a website or an app, sign-ups of a website or an app, leads to a website or an app, phone calls, app downloads, or awareness of a product or a concept, etc. In some embodiments, the KPI module 510 does not necessarily focus dogmatically on a particular KPI, regardless of the advertiser or the circumstances. Instead, the KPI module 510 focuses on client KPIs that are measurable and are meaningful marketing outcomes. As a result, the marketing strategy system 500 can make marketing investment decisions based on the relationships of the KPIs to what is important, rather than just what is easy to measure.

The machine learning module 520 parses existing KPI history data to develop an effectiveness profile of given broadcast events and/or more granular characteristics of broadcast events. In embodiments where existing KPI history data is undeveloped, the machine learning module 520 makes use of external marketing data to complete an observation phase. The external marketing data chosen may relate to competing products/services, or be purchasable set-top box (STB) data.

In a cold start situation, where a brand new advertiser has never aired a broadcast event, the system may employ external data. Granular STB data (e.g., post-logs of set-top boxes with time stamps) can provide detailed viewing habits and patterns of an audience. The model then can use the STB data as initial data to predict an audience's response. For example, the system can predict the effectiveness of an broadcast event on a TV channel, at a certain time, for a certain group of audience. Eventually, the system can gradually wash out the STB data once the advertiser receives data for the actual response to the advertisement.

During the signal processing, the machine learning module 520 estimates a base line level of a KPI and then recognizes an effect of an advertisement to the curve of the KPI response. In some embodiments, the machine learning module 520 estimates the effect using a Gibbs sampler. As a result, the machine learning module 520 has an enhanced ability to deal with the problem of event collision, and to avoid "splitting the difference" between proximate airings.

In some embodiments, the machine learning module 520 does not necessarily use simple deviation-from-baseline methods to gauge spot impact. Instead, the machine learning module 520 uses a combination of signal processing and wave decomposition techniques to more robustly estimate impact. For example, if two broadcast events are in spot collision (e.g., five seconds apart), the system can decompose the effect by assigning credits or weights to each of the advertisement events individually. Thus, the system can estimate the impact of each event (also called spot or errand). As a result, the machine learning module 520 provides a solution to the problems of response latency and spot collision. In some embodiments, the shape of all effectiveness curves are parameterized (e.g., by characteristics of FIG. 4). In other words, the shape of a curve can be determined by parameters (e.g., two parameters).

Hierarchical Bayes Model

In some embodiments, the intervals of data are treated as outcome variable depending on different things. The values of the intervals represent levels of response from the advertisements. The response outcomes can be treated as a function of dimensions of the decision variables. For example, the system not only knows the timestamps, but also knows the characteristics such as the network that the advertisement was on, the rotation, the time, the availability, etc. In some embodiments, the function is a hierarchical Bayes model. The model exploits independence of relationships, and learns from small data sets.

The model can particularly help newer advertisers. For example, a marketer puts the advertisement on air for a month and would like to start optimizing the marketing strategy. The hierarchical Bayes model is able to provide an effective strategy, even with a relatively small data set. If the advertiser does not have much data for a combination of a particular configuration, the system can use related data (hierarchical data) to predict the performance for the particular configuration.

For example, a marketer may not have a lot of observations of a given TV channel in an overnight time slot. However, the advertiser has observations on that TV channel at different times of the day and has observations on overnight time across other networks. The model can use the information to make an educated inference at what the given TV channel in the overnight timeslot will have for an effectiveness rating of future broadcast events on certain KPIs. These types of machine-learning inferences enable the system to generate effectiveness ratings for broadcast event characteristics where there is no KPI history data.

Regime Switching

In some embodiments, the machine learning module 520 can consider regime switching. The relationships between products/services and audiences change over time. For example, by introducing new programming or dropping existing programming, the marketers can gain or lose a certain audience for the product/service. By looking for different cutoff points in time, the module determines whether there is a significant difference in the performance of a KPI in recent time versus in the more distant past. In other words, the module determines whether the KPI is materially improved or materially degraded in its performance. Without regime switching, the module will look back at all the historical data. With regime switching, the module can use an appropriate amount of recent history to predict future performance. The module determines the cutoff of the recent history as a dynamic threshold, instead of a static threshold. The data before the regime-switching cutoff point can be ignored.

In some embodiments, instead of examining the effectiveness of an individual broadcast event, the system can observe a combinatorial effect of running broadcast events together. For example, if an broadcast event runs in one channel and runs another broadcast event in another channel, the system can estimate the combinatorial or interactive effect. The effect can be either positive or negative. For example, these channels used can share an audience, or the audience is channel hopping. It's possible for an audience to see a broadcast event twice, even though the audience is in two different channels. Similarly, the system can determine whether it's better to have a single creative asset (tone) or multiple creative assets. In some cases, the system can have multiple messaging channels. Whether a positive or negative combinatorial effect, the system generates actionable data.

To account for the change in effectiveness of a broadcast event, the optimization module 540 performs regime switching on the media inputs as a function of their weights and variables. A regime can be defined as a duration of time in which the effectiveness is deemed relevant. At the cut-off, the optimization module will reset how much data is kept over time.

In other words, if there is no relationship that exists between one advertisement airing on ESPN and the same advertisement running on ESPN2, the two events are mutually exclusive. On the other hand, if there is a combinatorial effect between the two events, a positive or negative effect can be calculated and may be represented as a quadratic problem.

Another situation to consider is if the two networks share the same audience, as the example networks ESPN and ESPN2 normally do. Many people may be changing the channel back and forth between the two networks and could observe the same advertisement on both networks, the audience member essentially being counted twice for observing the event.

In another situation, having multiple messaging channels, or advertisements, can be superior to airing the same advertisement. The optimization module can calculate if the expected value of each of the different advertisements, that all stem from the same advertiser, yields different results than airing one advertisement.

The feedback module 530 continuously feeds in new marketing data to the system 500 and re-optimizes. In other words, the system 500 constantly adapts to changing audience behaviors and media variables.

Based on the machine learning results, the optimization module 540 optimizes a broadcast event spending schedule, subject (of the advertiser) to constraints. The constraints can include, budget, day of week, or national or local availabilities, inventory status (e.g., whether an advertisement slot will likely be sold out), age suitability, spending timeframe, etc. In some embodiments, the optimization module 540 does not necessarily make marketing investing decisions just based on intermediate variables (e.g., impressions) or simple heuristics (e.g., audience indexing, efficiency heat maps, etc.). In some embodiments, the result of the optimization is to maximize a sum of the expected consumer responses. The optimization module 540 avoids the cognitive biases that are inevitable in constructing media strategies in human heads.

Based on the optimization, the prediction and management module 550 forecasts KPI outcomes and enables fast scenario modeling. The marketing strategy system 500 can further execute the strategy by submitting orders. The system can also produce automated sensitivity analysis and provides scenario modelling of a dollar's incremental effect on the audience response.

The system can provide architecture for a front-end server and back-end server, both being able to communicatively interact with the decision variables database, a user interface, the machine learning application, and the optimization application. Additionally, a user can access and input desired KPIs into the user interface, which can display a visual representation of trends, budget allocation, and scenario modeling.

In some embodiments, the model takes into account that a given broadcast event fades in effectiveness over time. One explanation for this is that consumers either get bored or are saturated with the content of the broadcast event (e.g., a television advertisement that predominantly features a particular pun as a joke gets old to viewers). The given broadcast event has a peak effectiveness rating when first implemented. Each curve has a peak effectiveness, and, as time progresses, the effectiveness decreases. Other examples for this are an unstable relationship between the viewership of televised NBA games during the championship finals games, regular season games, and no games during the off-season. More generally, different networks and the regular programming that the network airs will ebb and flow as the audiences' interests change. Different networks are continually observing an increase or decrease in viewership or introducing new programming or cancelling programming.

Figure 6:
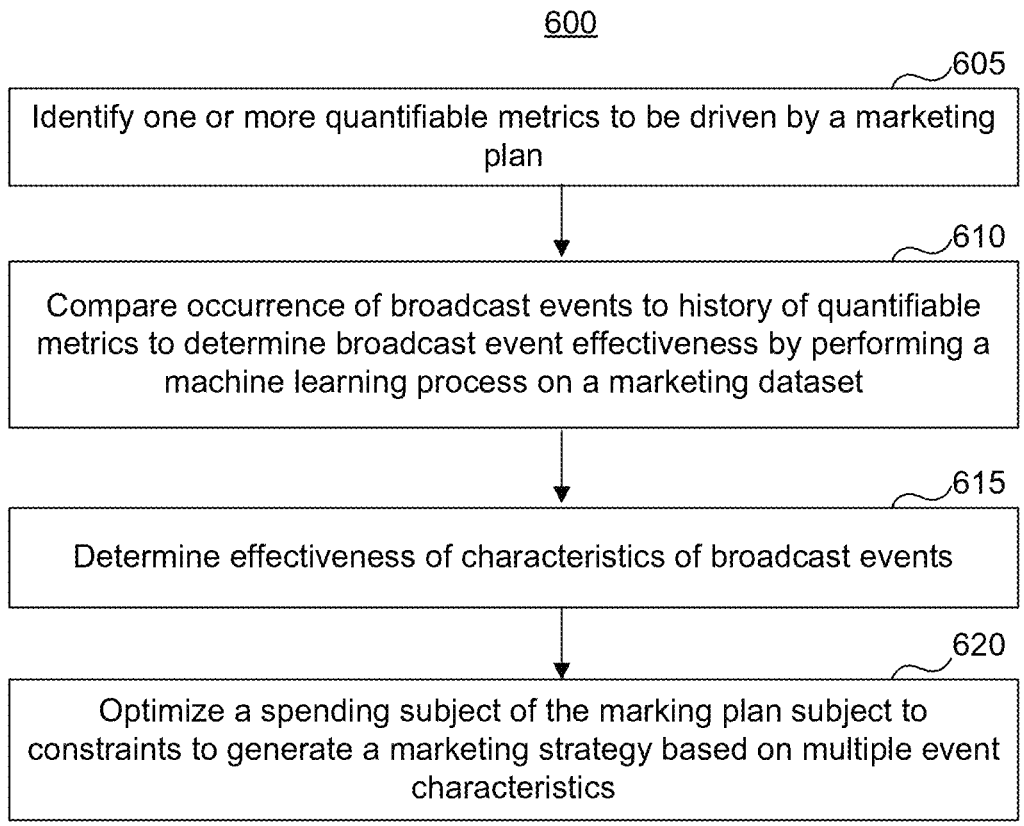
FIG. 6 illustrates a sample process of determining a machine learning marketing strategy.

FIG. 6 illustrates a sample process of determining a machine-learning marketing strategy. FIG. 6 illustrates a sample process of analyzing marketing data using machine learning. FIG. 5 illustrates a sample process of optimizing marketing media strategy based on machine learning.

In step 605, a the system identifies one or more quantifiable metrics from which effectiveness of broadcast events is determined. This decision may be user generated or based on the product/service offered. In step 610, the system compares occurrence of broadcast events to history of quantifiable metrics to determine broadcast event effectiveness by performing a machine learning process on a marketing dataset.

Step 610 is a machine learning signal processing phase. Raw data is input into a machine learning module to be normalized in a signal processing stage. A parsing module can exist in the machine learning module to automatically parse through the data, both input and output data.

In step 615, based on the comparison of the quantifiable metric to individual broadcast events, the system determines an effectiveness rating for each of the broadcast events. Additionally, each broadcast event is compared to other broadcast events in order to isolate and determine effectiveness of characteristics of each broadcast event.

In step 620, the system optimizes a spending subject of the marketing plan subject to constraints to generate a marketing strategy based on multiple event characteristics.

Figure 7:
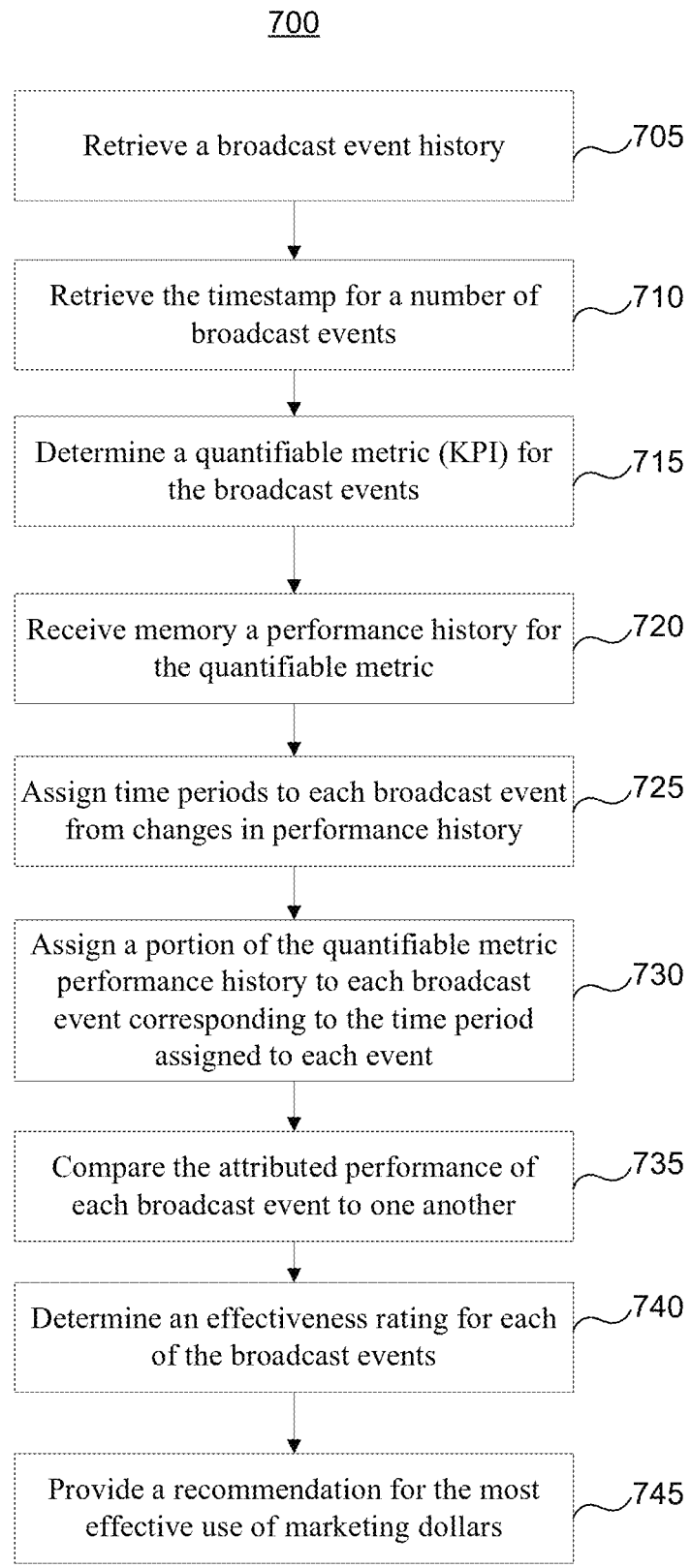
FIG. 7 is a flow chart illustrating an effectiveness rating process.

FIG. 7 is a flow chart illustrating an effectiveness rating process. In step 705, the system stores in memory a broadcast event history. The broadcast event history includes metadata of a plurality of broadcast events. Among the metadata are details such as a timestamp, a medium, channel, venue, content, tone, magnitude, time slot, and cost.

In step 710, the system retrieves the timestamp for a number of broadcast events. In step 715, the system determines a quantifiable metric (KPI) for the broadcast events. In step 720, the system stores in memory a performance history for the quantifiable metric. The performance history includes the quantifiable metric measured as a function of time.

In step 725, the system assigns time periods to each broadcast event based on changes in the performance history data occurring after the timestamp of the broadcast events.

In step 730, the system assigns a portion of the quantifiable metric performance history to each broadcast event corresponding to the time period assigned to each event. In some embodiments, rather than assigning all of the metric performance within the time periods, a portion or subset of the performance over the time period is attributed directly to given broadcast events. Time periods (and therefore all of a metric's performance within that time period) are attributed to broadcast events where there is little spot collision. Conversely, portions of the metric performance within a time period are assigned to broadcast events where one collides in time with another.

In step 735, the system compares the attributed performance of each broadcast event to one another. In step 740, the system determines an effectiveness rating for each of the broadcast events. In some embodiments, the system determines an effectiveness rating for specific characteristics of each broadcast event. Finally, in step 745, the system provides a recommendation for the most effective use of marketing dollars on future broadcast events.

Constrained Optimization

Within the optimization module, a user can prescribe constraints upon the media decisions, KPIs, and miscellaneous inputs. The constrained optimization module prompts the user to enter, into a graphic user interface, the values of importance. Based on the input values, the constrained optimization module performs a variation of the maximization process described previously. The constrained optimization module calculates the expected value of the function based on the constraints, then finds the parameter that maximizes the function such that it converges to a maximum likelihood estimate of a parameter. In other words, the constrained optimization will iterate through calculating the expected value and maximizing a parameter until it yields a best estimate.

In some scenarios, a user can specify the budgetary constraints, specifically relating to how much money they have to spend for a particular advertisement, or indicating what percentage of the user's overall budget needs to be allocated to a certain time frame, such on a weekend or during primetime. A user can also specify how much inventory is available by the manufacturers or retailers for the product being advertised. Another constraint that can be placed on the advertisement relates to Broadcast Standards and Practices, such that the network airing the advertisement is responsible for the moral, ethical, and legal implications. These Standards and Practices extend beyond advertisements to the programs themselves. For example, it would not be up to Broadcast Standards and Practices to air an advertisement targeted to mature audiences on family-friendly networks or during mid-day when children may be watching television.

Graphical User Interface (GUI)

A user can log in to a graphical user interface to see a dashboard of metrics. For example, the dashboard can display to a user what the money they invested was spent on, and the costs for registering a targeted user on all of the indicated networks at different times. The information is generated automatically via the machine-learning module and optimization module, and can be interpreted as the reasoning for an executable media decision.

Exemplary Computer System

Figure 8:
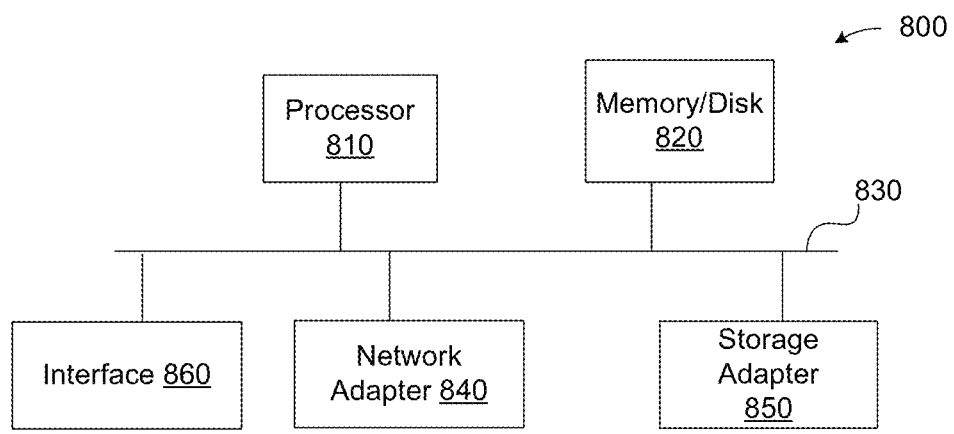
FIG. 8 is a diagrammatic representation of a machine in the example form of a computer system within which a set of instructions, for causing the machine to perform any one or more of the methodologies or modules discussed herein, may be executed.

FIG. 8 is a diagrammatic representation of a machine in the example form of a computer system 800 within which a set of instructions, for causing the machine to perform any one or more of the methodologies or modules discussed herein, may be executed.

The computer system 800 includes a processor 810, memory and non-volatile memory 820, a communications BUS 830, a network adapter 840, a disk interface 850 and an interface device 860. Various common components (e.g., cache memory) are omitted for illustrative simplicity. The computer system 800 is intended to illustrate a hardware device on which any of the components described in the examples (and any other components described in this specification) can be implemented. The components of the computer system 800 are coupled together via the bus 830 or through some other known or convenient device.

This disclosure contemplates the computer system 800 taking any suitable physical form. As an example, and not by way of limitation, a computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform, without substantial spatial or temporal limitation, one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods, described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include, at least, a processor, memory, and a device (e.g., a bus) coupling the memory to the processor.

The front-end server interfaces with a user interface, obtaining user inputs relating to, for example, desired KPIs. The front-end server can contain infrastructure to perform user management such as log-in information and advertising account information. In some embodiments, the front-end server can also contain a web server that communicates with a user interface. Some embodiments of the front-end server can contain a rendering module in which it can process a user-inputted request. It can load a page, a layout of the page with CSS and JavaScript, and content of the page.

A back-end server behaves as an intermediary between the front-end server, the database server, the machine learning module, and optimization module. The back-end server performs all the computations and processes input and sends this information back to the front-end server. In one embodiment, the back-end server can contain a data verification module that communicates with the database server to verify that the data stored in either the decision variables database or the KPI database is the most up-to-date data.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system, and its associated file management system. The file management system is typically stored in the non-volatile memory and/or drive unit and causes the processor to execute the various acts required by the operating system to input and output data and to store data in the memory, including storing files on the non-volatile memory and/or drive unit.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a stand-alone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine, and that cause the machine to perform any one or more of the methodologies or modules of the presently disclosed technique and innovation.

In general, the routines executed to implement the embodiments of the disclosure may be implemented as part of an operating system or a specific application, component, program, object, module or sequence of instructions, referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Further examples of machine-readable storage media, machine-readable media, or computer-readable (storage) media include, but are not limited to, recordable-type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission-type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation; rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application" or "app") may include one or more modules, or a module may include one or more application programs.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully-functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein.

Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A method performed by a computer system for determining measurable responses to a plurality of broadcast events, the method comprising:
   storing, in a memory of the computer system, a set of historical data including measurements of a key performance indicator (KPI), subsets of the set of historical data include metadata comprising at least a timestamp, a channel, and a magnitude to be associated with a given broadcast event of the plurality of broadcast events;
   identifying, in a computer system, an existence of a regime switching point for the given broadcast event, the regime switching point based on a cutoff point established by a dynamic threshold difference in performance of the KPI in a recent time period versus a past time period;
   wherein:
      in response to identification of the existence of the regime switching point:
         ignoring, using the computer system, measurement of the KPI before the regime switching point of the given broadcast event, and
         crediting, using the computer system, measurement of the KPI in the recent time period, after the regime switching point, to the given broadcast event to predict future performance;
      in response to identification of no existing regime switching point, crediting, using the computer system, the measurements of the KPI across the set of historical data to the given broadcast event to predict future performance; and
   calculating, in the computer system, a predicted effectiveness of a future broadcast event having a same character as the given broadcast event based on the credited measurements of the KPI used to predict future performance.

2. The method of claim 1, further comprising:
   calculating, by the computer system, a predicted effectiveness of a second future broadcast event having a same character as the given broadcast event based on the measurements of the KPI before the regime switching point and ignoring the measurements of the KPI after the regime switching point.

3. The method of claim 1, further comprising:
   identifying, by the computer system, a beginning cutoff point in time and an ending cutoff point in time for the set of historical data, wherein measurements of the KPI before the beginning cutoff point in time are not credited to the given broadcast event and measurements of the KPI after the ending cutoff point in time are not credited to a second broadcast event.

4. The method of claim 3, wherein the given broadcast event or the second broadcast event further include a medium, the medium is any of: print; picture; video; audio; or multimedia; and the channel is any of: a website; a television channel; a streaming video or video on demand service; a podcast personality; a radio station; or signage.

5. The method of claim 1, wherein the dynamic threshold is based on a slope of the measurements of the KPI as a function of time.

6. The method of claim 1, wherein the given broadcast event further includes an event length and the event length is used as a further basis for said calculating the predicted effectiveness.

7. The method of claim 1, wherein a budget, a day of week, a national or local availability, an inventory status, an age suitability, or spending timeframe is used as a further basis for said calculating the predicted effectiveness.

8. The method of claim 1, wherein the regime switching point is identified based on a low point between two peak points in the measurements of the KPI.

9. A non-transitory computer-readable storage medium comprising computer instructions when executed by a processor for determining measurable responses to a plurality of broadcast events, cause a computer system to perform those steps of:
storing, in a memory of the computer system, a set of historical data including measurements of a key performance indicator (KPI), subsets of the set of historical data include metadata comprising at least a timestamp, a channel, and a magnitude to be associated with a given broadcast event of the plurality of broadcast events;
identifying an existence of a regime switching point for the given broadcast event, the regime switching point based on a cutoff point established by a dynamic threshold difference in performance of the KPI in a recent time period versus a past time period;
wherein:
in response to identification of the existence of the regime switching point:
ignoring, using the computer system, measurement of the KPI before the regime switching point of the given broadcast event, and
crediting, using the computer system, measurement of the KPI in the recent time period, after the regime switching point, to the given broadcast event to predict future performance;
in response to identification of no existing regime switching point, crediting, using the computer system, the measurements of the KPI across the set of historical data to the given broadcast event to predict future performance;
calculating a predicted effectiveness of a future broadcast event having a same character as the given broadcast history based on the credited measurements of the KPI used to predict future performance.

10. The non-transitory computer-readable storage medium of claim 9, further comprising:
calculating a predicted effectiveness of a second future broadcast event having a same character as the given broadcast event based on the measurements of the KPI after the regime switching point and ignoring the measurements of the KPI before the regime switching point.

11. The non-transitory computer-readable storage medium of claim 9, wherein the dynamic threshold is based on a slope of the measurements of the KPI as a function of time.

12. The non-transitory computer-readable storage medium of claim 9, wherein the regime switching point is identified as a low point between two peak points in the measurements of the KPI.

13. The non-transitory computer-readable storage medium of claim 9, wherein the character of the given broadcast event includes an emotional tone and the emotional tone is used as a further basis for said calculating the predicted effectiveness.

14. The non-transitory computer-readable storage medium of claim 9, wherein the given broadcast event further includes an event length and the event length is used as a further basis for said calculating the predicted effectiveness.

15. A system for assignment of measurable responses to broadcast events, comprising:
a memory of a computer system storing a set of historical data including measurements of a key performance indicator (KPI), subsets of the set of historical data include metadata comprising at least a timestamp, a channel, and a magnitude to be associated with a given broadcast event; and
a processor of the computer system executing instructions stored in the memory that identify an existence of a regime switching point for the given broadcast event, the regime switching point based on a cutoff point established by a dynamic threshold difference in performance of the KPI in a recent time period versus a past time period, wherein existence of the regime switching point causes the processor of the computer system to credit the measurements of the KPI in the recent time period after the regime switching point to the given broadcast event to predict future performance and ignore the measurements of the KPI before the regime switching point, and wherein no existing regime switching point causes the processor of the computer system to credit the measurements of the KPI across the set of historical data to the given broadcast event to predict future performance, and wherein the processor calculates a predicted effectiveness of a future broadcast event having a same character as the given broadcast history based on the credited measurements of the KPI used to predict future performance.

16. The system of claim 15, wherein the dynamic threshold is based on a slope of the measurements of the KPI as a function of time.

17. The system of claim 15, wherein the regime switching point is identified as a low point between two peak points in the measurements of the KPI.

18. The system of claim 15, wherein the character of the given broadcast event includes an emotional tone and the emotional tone is used as a further basis for said determining the predicted effectiveness.

19. The system of claim 15, wherein the given broadcast event further includes an event length and the event length is used as a further basis for said calculating the predicted effectiveness.

20. The system of claim 15, wherein the character of the given broadcast event is any of: print; picture; video; audio; or multimedia.

* * * * *